United States Patent
Hanus

(10) Patent No.: US 11,465,700 B2
(45) Date of Patent: Oct. 11, 2022

(54) AUTOMATED TRANSPORTATION SYSTEM INCLUDING VEHICLE RETENTION

(71) Applicant: John P. Hanus, Hartland, WI (US)

(72) Inventor: John P. Hanus, Hartland, WI (US)

( * ) Notice: Subject to any disclaimer, the term of this patent is extended or adjusted under 35 U.S.C. 154(b) by 545 days.

(21) Appl. No.: 16/206,686

(22) Filed: Oct. 4, 2019

(65) Prior Publication Data

US 2020/0239091 A1 Jul. 30, 2020

(51) Int. Cl.
*B62D 63/04* (2006.01)
*B60K 5/00* (2006.01)

(52) U.S. Cl.
CPC ............... *B62D 63/04* (2013.01); *B60K 5/00* (2013.01)

(58) Field of Classification Search
CPC .. B62D 63/04; B60K 5/00; E01B 7/14; B65G 35/06; F26B 15/16
USPC ..... 198/339.1; 104/130, 121, 247, 119, 120, 104/130.01, 130.03, 130.11, 178, 236, 104/263
See application file for complete search history.

(56) References Cited

U.S. PATENT DOCUMENTS

| | | | |
|---|---|---|---|
| 2,718,194 A * | 9/1955 | Ruhlmann | B62D 1/265 104/247 |
| 4,034,680 A | 7/1977 | Hamada | |
| 4,213,396 A | 7/1980 | Mehren | |
| 4,301,739 A * | 11/1981 | Mehren | B62D 1/265 180/401 |
| 4,347,791 A | 9/1982 | Mandros | |
| 4,596,192 A | 6/1986 | Hans-Joachim | |
| 4,658,731 A * | 4/1987 | Schumann | B66F 9/072 104/247 |
| 5,134,940 A | 8/1992 | Fujita | |
| 5,138,952 A | 8/1992 | Low | |
| 5,289,778 A | 3/1994 | Romine | |
| 5,775,227 A | 7/1998 | Mullen | |
| 5,845,583 A | 12/1998 | Jensen | |
| 5,979,334 A | 11/1999 | Lund | |
| 6,012,396 A | 1/2000 | Schulz | |
| 6,129,028 A | 10/2000 | Shaw | |
| 6,237,504 B1 | 5/2001 | Tanahashi | |
| 6,279,484 B1 * | 8/2001 | Shaw | E01B 25/12 104/130.09 |
| 10,359,234 B2 * | 7/2019 | Robbin | F26B 3/04 |
| 2011/0218697 A1 | 9/2011 | Goldberg | |

* cited by examiner

*Primary Examiner* — D Glenn Dayoan
*Assistant Examiner* — Sunsurraye Westbrook

(57) ABSTRACT

An automated transportation system incorporating a special guideway featuring recessed control slots in the sidewalls on each side of the roadway surface and a vehicle which includes movable appendages designed to interact with the control slots to provide vehicle retention.

6 Claims, 2 Drawing Sheets

Fairing

Control arm end

Control Arm - Extended

Fairing

Control arm end

Control Arm - Retracted

AUTOMATED TRANSPORTATION SYSTEM INCLUDING VEHICLE RETENTION

CROSS REFERENCE TO RELATED APPLICATIONS

The present application claims the benefit of Provisional Patent Application 62/708,119 with a filing date Dec. 4, 2017.

FIELD OF THE INVENTION

The present invention describes a transportation system containing elements which will allow a vehicle to travel on existing roads while also being capable of traveling on a special guideway under automatic control. Through design of the vehicle and guideway, the system will provide a redundant physical retention capability which will be initiated in the event of an emergency situation. The components of the system include: (1) a special guideway, (2) a vehicle specifically designed to operate on the guideway, and (3) a control system which will monitor and adjust the position of all vehicles on the guideway.

Accordingly, besides the properties of the transportation system described herein, several other objectives and advantages of the present invention will be:
provide automatic transportation with minimal driver input
provide efficient transportation by allowing vehicles to travel closely behind each other in a 'drafting' configuration
provide high speed transportation in a safe environment
provide a means wherein vehicles operating on the guideway will also be capable of operating on existing roads.
provide a means of expanding the range of battery powered vehicles by supplying power directly from the guideway.
provide an efficient transportation system which will help curb greenhouse gas emissions by reducing the demand for fossil fuels.

The invention provides an advanced form of transportation wherein a user will be transported from one location to another in an individual vehicle under automatic guidance while, in another mode, the user will be able to drive the vehicle on existing roadways in the same manner as a typical automobile, or in a further embodiment, as a fully automated vehicle. The invention will provide a form of mass transportation wherein individual vehicles are included with buses or other mass transit vehicles on a special guideway.

The transportation system herein described includes a guideway featuring slotted sidewalls herein called 'control slots' and a vehicle including extendable and retractable appendages herein referred to as 'control arms', designed to interact with the control slots of the guideway. The vehicles used in the system are designed to operate under automatic guidance when the control arms are in an extended position and interacting with the guideway, while also being capable of traveling on existing roads under operator or automated control when the control arms are retracted.

The guideway described herein represents a system that utilizes control arms on both sides of the vehicle and corresponding control slots on each side of the roadway. A system that utilizes only a single control arm and single control slot would be possible without deviating from the scope of the invention. Because of the likelihood that the guideway will be elevated at times, a second sidewall would typically be included for safety and two control arms may be advantageous for purposes of aerodynamics. To describe the system in a more concise format and using a likely embodiment, the instant invention describes a system that includes two control arms and two control slots rather that a single control arm and single control slot system.

The transportation system comprises: a guideway featuring control slots incorporated into vertical sidewalls, a vehicle featuring retractable, semi-independent control arms attached through connective means designed to interact with the control slots in the sidewalls, and a control system which will monitor, adjust and control all of the vehicles traveling on the guideway. The main purpose of the guideway containing the control slots and the vehicles with the interacting control arms is to create a failsafe connection between the guideway and the vehicle wherein in an emergency, the vehicle will be physically retained on the guideway and thereby provide a high degree of safety for the occupants of the vehicle. Further advantages will become apparent from a consideration of the ensuing description and drawings.

DESCRIPTION OF PRIOR ART

Automated personal vehicle transportation has been of interest for many years and as such, many transportation systems have been developed to address the demand for a system which would include personal vehicles which could travel on existing roads while also being capable of operating on a special controlled roadway. One design group includes a separate carriage on which a vehicle would be attached. U.S. Pat. No. 4,347,791 issued to Mandros describes a system wherein the vehicle is attached to a carriage which is in turn driven by an air powered piston. Other examples are described in Lund U.S. Pat. No. 5,979,334, Mullen U.S. Pat. No. 5,775,227 and Goldberg U.S. Pat App. 2011/0218697 which also utilize a separate carriage to transport a vehicle. More prevalent are systems which incorporate guide wheels designed to ride against sidewalls of a roadway to direct the vehicle. An example is Hamada U.S. Pat. No. 4,034,680 which describes a system wherein lateral control is provided through the use of guide wheels. A similar design is described in Fujita U.S. Pat. No. 5,134,940 and Hans-Joachim U.S. Pat. No. 4,596,192. Tanahashi U.S. Pat. No. 6,237,504 provides for a system which utilizes a non-contact lateral control system which converts to a contact system using guide wheels. Mehren U.S. Pat. No. 4,213,396 describes a system that incorporates a guide wheel in a contiguous channel and Low U.S. Pat. No. 5,138,952 describes a system that utilizes a guide wheel in a longitudinal slot to provide lateral control. More exotic systems include special vehicle and track designs such as Jensen U.S. Pat. No. 5,845,583 which provides a triangular shaped roadway and corresponding triangular shaped aperture constructed into the chassis of the vehicle and Schulz U.S. Pat. No. 6,012,396 which describes another central rail concept that allows vehicles to operate on existing roadways while also being able to utilize a slanted rail with propulsion provided by an extra set of drive wheels. Another design includes Shaw U.S. Pat. No. 6,129,028 which relies on a T shaped rail to provide control and Romine U.S. Pat. No. 5,289,778 which includes attaching a vehicle to a suspended rail.

SUMMARY OF THE INVENTION

The invention can best be described as:
1. A special guideway:
    including a roadway surface similar in appearance to an existing highway, featuring sidewalls located at the outside edge of the roadway, positioned generally perpendicular to the roadway and having a relatively short top panel parallel to the roadway, a position 90° to the sidewall. In a preferred embodiment, a return flange extending downward or parallel to the sidewall will be included. If viewed from end-on, the guideway would best be described as a roadway with vertical sides continuing into a "C" shape. The opposite side of the guideway would be described as a mirror image design if viewed from end on, therein having a reversed "C" shape.
2. A special vehicle:
    capable of traveling on existing roads under operator or computer control, while also being capable of traveling on the guideway under systemwide computer control. The vehicle will include extendable control arms, the ends of which being designed to be contained within corresponding control slots in the "C" shaped sidewalls of the guideway.
3. A computerized control system designed to monitor and control all of the vehicles traveling on the guideway.

The invention incorporates computer monitored position sensor elements located on the vehicle, the guideway and/or the control arms which are designed to allow the vehicles to travel on the guideway without the control arms coming in contact with the vertical sidewalls. In the event of an emergency or power failure, the vehicle will be physically retained on the guideway through interaction between the vertical sidewalls and the control arms located on the vehicle. Computer control will optimally position the vehicle on the guideway both laterally as well as longitudinally, therein minimizing or eliminating contact with the sidewalls of the guideway except in emergency situations. In the event the vehicle deviates laterally between the sidewalls, the computerized control system will recognize the deviation and will direct the vehicle's steering system to adjust the vehicle's position. The control arms working in conjunction with the computer control system's corrective action, will keep the vehicle on the prescribed course while minimizing contact between the control arms and the control slots and therein between the vehicle and the guideway.

Position Control

Lateral control of the vehicle while on the guideway could be accomplished through a variety of techniques. The vehicle could follow an electronic path, possibly created by optical or magnetic signals, or by measuring the amount of pressure exerted through sensor elements on the control arms, or through GPS, radar or any other means which would determine the vehicles' position on the guideway. This positional information will be relayed to the vehicle's onboard computer(s) which will adjust the steering of the vehicle to keep it in an optimum lateral position between the two parallel sidewalls located on the outside edge of the guideway. Lateral positioning will be determined through computer interchange between the position sensors located on the vehicle and/or the guideway and the vehicle computer(s). The onboard computer(s) will read the data from the sensors and adjust the steering system of the vehicle, most likely making adjustments several times per second.

Longitudinal positioning will be accomplished through communication between the onboard computer(s) and the systemwide computer(s), an interaction which will process the positional information for all the vehicles on the system and will communicate back to the individual cars, in most likelihood, controlling and assembling the vehicles into a 'train' of vehicles traveling close to or even touching each other. This 'nesting' technique will allow high traffic density and minimal wind resistance for each vehicle and thereby provide higher efficiency and speed. Vehicle positioning may be created or enhanced through position sensors located on the control arms or through optical, radar, radio or magnetic sensing, satellite positioning, bar code readers or any other technique which would provide accurate position determination without deviating from the scope of the invention.

Vehicle Retention on the Guideway

The physical retention example herein described comprises:
    A guideway with vertical outside sidewalls featuring control slots designed to accept movable control arms located on the vehicle.
    A vehicle with movable control arms which extend and retract from the sides of the vehicle and which are designed to position themselves within the control slots located in the sidewalls of the guideway.

As the vehicle proceeds onto an entrance ramp, the movable control arms will automatically extend outwards from the vehicle and position themselves within the control slots on the vertical sidewalls of the guideway. In a preferred embodiment, the control slots will include a 'return flange' which represents a portion of the top panel of the sidewall that extends downward toward the roadway surface. The return flange provides an additional physical barrier which will prevent the control arm from raising upwards and leaving the control slot. In a preferred embodiment, the control arms will be 'active' in that they will move automatically and independently along several axis in order to compensate for roadway or vehicle variations. This will allow the control arms to 'float' within the control slot with little or no contact with the sidewalls. Through interaction between the position sensors and the onboard computers, accurate lateral positioning will allow the vehicle to stay in a straight and stable position.

It may be advantageous for the recessed area on the vertical sidewalls to be used as a power transmission area. Power transmission could be accomplished by conduction, wherein electrical 'brushes' sweep against power rails or through induction wherein power is transmitted without contact. As a safety enhancement, elements for power transmission may be located at the ends of the retractable control arms and within the control slots located on the vertical sidewalls or other surface within the slotted area of the sidewall.

Traffic Compression

Both the 'guideway' and 'vehicle' will include position sensor elements designed to control the lateral as well as longitudinal positioning of the vehicle while on the guideway. Interaction between the control elements and the vehicle's steering, braking, and propulsion systems will position the vehicle laterally as well as longitudinally within the guideway to minimize contact between the control arms and the sidewalls. This interaction between the vehicle and the guideway will allow the vehicles to travel in close proximity to each other, allowing the vehicles to be assembled into a 'train' of cars, 'drafting' the preceding vehicle and thereby allowing the vehicles to travel on the system with minimal wind resistance. The ability of the vehicles to draft each other will result in a measurable increase in speed, energy efficiency and traffic volume. Coordination between the position sensors, the onboard and systemwide computer systems and the vehicle's steering, braking, and propulsion control systems will interact with each other to accurately position the vehicle laterally as well as longitudinally on the guideway.

A vehicle traveling on the guideway will be 'electronically positioned', through the interaction of the position sensors in coordination with the vehicle's control systems, and 'physically retained', through the shape and design of the guideway sidewalls and the interactive control arm components featured on the vehicle. The vehicle will be retained on the guideway due to: (a) interaction between the computerized components which will accurately position the vehicle on the guideway and (b) the control arms location within the control slots in the sidewalls of the guideway. Lateral positioning will allow the control arms to 'float' within the control slots in the sidewalls, an action which will reduce contact between the control arms located on the vehicle and the control slots located on the guideway.

The control arms, when extended from the vehicle, will be physically 'trapped' within the ' C' shaped control slots in the sidewalls of the guideway, an action that prevents the control arms from escaping and thereby providing physical retention of the vehicle on the guideway. While on the guideway, the vehicle will be under computer control which could best be described as an interactive system between a main or systemwide computer or computers and an onboard computer or computers located on the vehicle.

In a preferred embodiment, electronic information will be exchanged between computers through a transmission and reception means designed into the guideway and the vehicle. Through the information transmission and reception means, information concerning location of the vehicle in relation to other vehicles on the guideway, routing, vehicle spacing, vehicle speed and other data will be transferred between the main systemwide computer(s) and the computer(s) incorporated in each vehicle on the guideway. This action will allow 'systemwide' computer control of all vehicles operating on the guideway and will allow the vehicles to travel efficiently at high speed. In addition, the ability of computers to control and compress the traffic will allow a 'drafting' effect with each vehicle closely following the vehicle in front of it, thereby creating an optimal environment in which each vehicle in the 'train' of vehicles will travel.

The main functions of the control arms are as a physical safety device to retain the vehicle on the guideway and as part of the control system of the vehicle. As such, any deviation the vehicle makes from a predetermined position will be recognized through the movement of the control arms interacting with the control slots located in the sidewalls of the guideway. Any aberration detected by the control system will be corrected by alignment of the vehicle's wheels through interaction of the control system and the vehicle's steering mechanism. In a preferred embodiment, the vehicle control system will be capable of controlling the position, speed and braking of the vehicle in relation to other vehicles on the guideway and will automatically direct the vehicle to the destination selected by the operator. In a preferred embodiment, the control arms will be located at the most optimum location on the vehicle to enhance safety.

It should be noted that a guideway featuring a single control arm and corresponding control slot rather than the two control arm and two control slot system described herein could be incorporated without deviating from the scope of the invention. Strength and safety considerations would be necessary to insure vehicle retention when traveling on the guideway system when incorporating a single control arm and single control slot design.

Additional technologies that can be readily applied to the system include but are not limited to: electric steering systems, four wheel steering systems, ABS braking systems, traction control and adaptive cruise control. In the event that the position sensors fail, power is interrupted, or other unforeseen event occurs, the vehicle will be physically retained on the guideway through the design and interaction of the control arms on the vehicle and the control slots located in the sidewalls of the guideway.

In a preferred but not limiting embodiment, the system will feature components which will allow transmission of electric power from the guideway to the vehicle. The transmission of electric power while the vehicle is operating on the guideway will facilitate: operation of the vehicle motor(s), operation of the vehicle's auxiliary equipment, operation of control components, and recharging of the vehicle battery(s), an action which will assist in the operation of the vehicle while traveling under battery power on existing roads. The vehicles could also be powered by a 'linear induction motor' means wherein components of the guideway act as one part of the motor and components of the vehicle act as the other part of the motor without deviating from the scope of the invention. Transmission of electric power can be facilitated through electrical induction, electrical conduction or other means. One technique would involve transmission of energy from the guideway to the vehicle and/or the control arms through non-contact electrical inductive elements. Another technique would involve conduction through contacts located on the vehicle and/or the control arms and contacts located in the guideway or the control slots. In a further preferred embodiment, the movable control arms will feature conductive or inductive elements on the uppermost end of the control arms which are designed to interact with corresponding conductive or inductive elements located on the underside of the top panel of the sidewall. In an additional preferred embodiment, a return flange on the sidewall will extend back downward toward the roadway surface, thereby positioning the power elements in a protected and isolated location. Other power systems including fuel powered, hybrid electric power or other vehicle propulsion means could be utilized without deviating from the scope of the invention.

In a further embodiment, the aerodynamic shape of the control arms and the vehicle could assist in providing a degree of 'lift' to help reduce downward air pressure on the vehicle when traveling on the guideway at high speed. This downward pressure is normally advantageous as a means of holding a vehicle down when traveling at high speed on a non-controlled roadway, thereby reducing the chance of the vehicle becoming airborne. A reduction in downforce will provide a degree of lift and thereby reduce drag and operational wear on the vehicle. This action will be further enhanced by the design of the guideway wherein air would be compressed in the channel created by the guideway surface, the sidewalls of the guideway and the vehicle frontal design. From a physics perspective, downforce equals drag—the faster a vehicle travels, the harder the air pushes the vehicle down. As is the case with race boats, which gain speed as they lift out of the water or 'hydroplane', vehicles on the guideway would 'aeroplane' to minimize contact with the roadway surface.

Additional aerodynamic enhancements could include: fairings on the vehicles which are controlled by a central computer and which are adjustable in angle and incidence across the entire train of vehicles. As such, computer(s) would adjust the fairings on individual vehicles to maximize the efficiency of the assembly of vehicles as a whole.

In another embodiment, a plasma flow control technique could be included in the design of the vehicle and the control arms to minimize air flow over the skin of the vehicle. Plazma flow techniques could be well suited to the present invention in that plazma flow systems work only with high voltage, which could be provided, and work best within enclosed spaces, which is inherent in the system.

The control arms will be hingedly connected and extendable from the vehicle with movement moderately independent from the movements of the vehicle. In this preferred but non-limiting embodiment, the control arms will feature an end portion designed to slide within the control slot in the sidewall of the guideway. The end portion of the control arms is designed to interact with the control slot and could include an active restraint mechanism, a design which would change the shape of the end of the control arms once in place. The active system will include automatic controls which will lift or rotate the end portion of the control arms, thereby providing additional physical restraint and the provision for energy transfer elements. A non-adjustable restraint design wherein the terminus end of the control arm is 'fixed' or non-changing could also be incorporated.

DETAILED DESCRIPTION OF THE INVENTION

Figure 1:
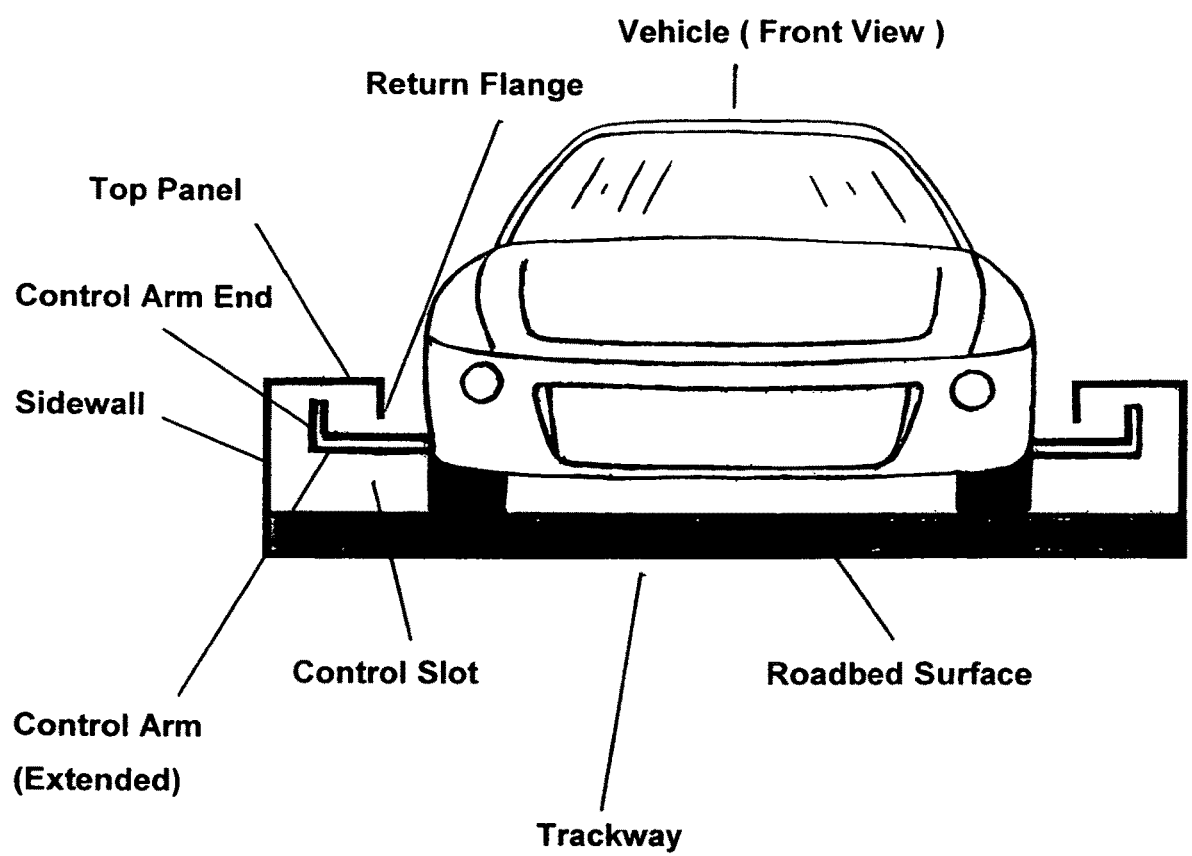
FIG. 1 is a cut away end-on view of a guideway with a compatible vehicle including control arms shown in an extended position and interacting with the control slots in the sidewalls of the guideway.
Figure 2:
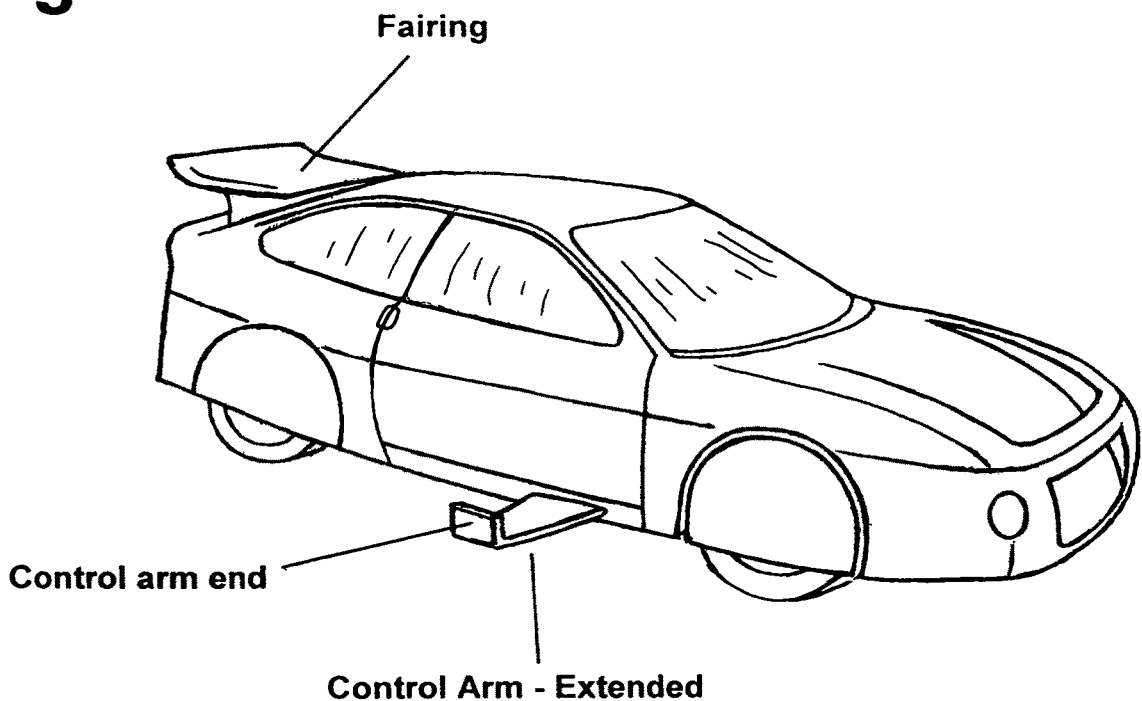
FIG. 2 is a ¾ view of a vehicle featuring a movable control arm shown in an extended position.
Figure 3:
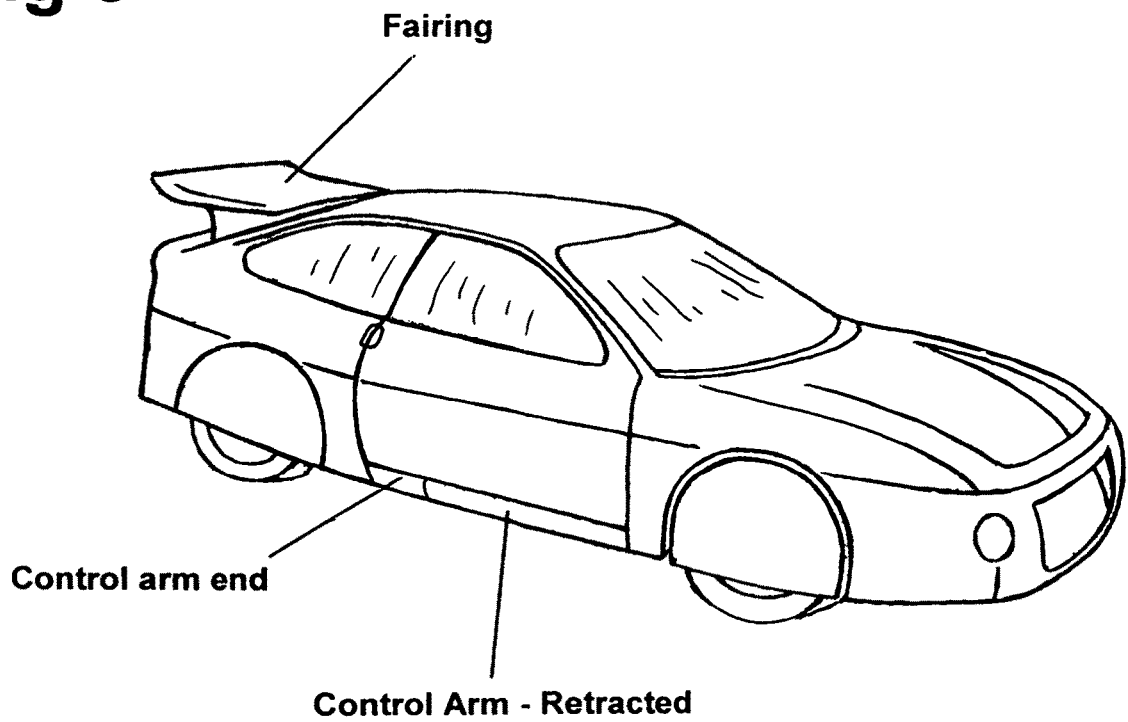
FIG. 3 is a ¾ view of a vehicle featuring a movable control arm shown in a retracted position.

A person using the guideway 10 will drive or direct a guideway compliant vehicle 30 similar in appearance to an existing automobile, although in most likelihood, battery powered or hybrid battery powered, onto a ramp similar to a freeway ramp. On the ramp, the vehicle 30 will automatically transition from a driver-operated or automated vehicle to a guideway 10 controlled automated vehicle. The vehicle 30 will automatically extend control arms 22 outwards from the lower sides of the vehicle, therein positioning the control arms 22 within the control slots 25 located on the vertical sidewalls 15 of the guideway 10. Once on the guideway 10, the vehicle 30 will be able to communicate with a systemwide computer through interaction with an onboard computer system to determine its location, the location of other vehicles traveling on the guideway and the most efficient route to the desired destination.

When the vehicle 30 is on the guideway 10, the control arms 22 will extend outwards from the vehicle and position themselves within the control slots 25 on the vertical sidewalls 15 of the guideway. In a preferred embodiment, the control arms 22 will feature articulating or rotatable end portions 24 designed to interact with conductive or inductive electrical transmission elements 18 located on the underside of the top panel 16 of the sidewall 15. This action will position the electric power elements 18 in a protective area behind the return flange 17 attached at the inside terminal edge 27 of the top panel 16 and extending downward toward the roadway surface 29. In operation, the control arms 22 will have little or no contact with the vertical sidewalls 15 or return flange 17 other than the electrical conduction elements due to the lateral control provided by the position sensors and the onboard computer interacting with the steering system of the vehicle 30. In the event of an emergency, wherein automatic control is disconnected or ineffective, the control arms will be capable of holding the vehicle 30 on the guideway 10, in all likelihood, with the control arms 22 and end portions 24 contacting the vertical sides 15, top panel 16 and/or the return flange 17 portion of the control slots located on the vertical sidewalls 15 of the guideway. The top panel 16 and return flange 17 portions of the vertical sidewalls 15 create a physical barrier which will prevent the control arms 22 from traveling out of the control slots 25 and therein preventing the vehicle from leaving the guideway 10. This retention method will provide a high level of safety while requiring minimal physical contact under normal operating conditions. In a preferred embodiment, the control arms 22 will provide additional braking action by automatically extending against the vertical sidewalls 15 and/or the return flange 17 to aid in stopping the vehicle in an emergency. When not on the guideway 10, the control arms 22 will automatically retract into the vehicle 30 and the vehicle will be capable of being driven in the same manner as an existing automobile, with, in all likelihood, the vehicle being battery or hybrid powered and automatically controlled.

Entering the Guideway

The operator of the vehicle 30 will have the ability to direct the vehicle on existing urban and suburban streets in the manner of a typical driver controlled or automated vehicle. Using the guideway 10 system, the operator will drive or direct the vehicle 30 to a special entrance ramp. In a preferred but not limiting embodiment, the approach to the ramp will include a 'transition zone' wherein the vehicle will pass over an electronic monitoring and check-in area. The computer(s) will check the various components of the vehicle and report through a transmission means to a main systemwide computer. Condition and age of the vehicle 30 components as well as vehicle identification information will be checked and recorded. If all is in order, the vehicle 30 will automatically prepare itself to enter the guideway 10. Preparation will involve the extension of the control arms 22 from the vehicle 30 and interaction of the control arms 22 with the control slots 25 in the vertical sidewalls 15 of the guideway 10. If for any reason the vehicle 30 is not accepted by the system, an automatic turnout will be provided or the vehicle 30 will be removed from the guideway 10 at the next exit ramp. Once on the system, the operator will select a destination and relay it to the vehicle 30 computer. This could be accomplished manually, through voice control or through other interactive means.

Travel on the Guideway

Computer interaction will determine where the vehicle 30 will be placed in relation to other traffic already operating on the guideway. The main systemwide computer will then compress the traffic by assembling a car 'train', with one vehicle traveling closely behind the vehicle in front of it. This action will facilitate a 'drafting' effect, creating an optimal environment for each vehicle traveling in the car train, an action which will allow high speed travel efficiency. At all times, the systemwide computer will know precisely where each vehicle 30 is located on the guideway and its destination, and will adjust the traffic accordingly. The trains could be made up of any combination of personal vehicles and/or mass transit 'bus' type vehicles without deviating from the scope of the invention. In a manner, the guideway 10 and vehicle 30 system will operate as a single computerized transportation system.

Exiting the Guideway

Exiting the guideway will be automatically assisted in the same manner as entrance. The main systemwide computer will determine which vehicles 30 are exiting at each ramp and will direct the vehicle to exit via the ramp. As the vehicle 30 is exiting the guideway 10, computer(s) will alert the operator and the control arms 22 will reposition into the vehicle. In a preferred embodiment, in the event of a driver emergency or where there is some type of mechanical failure with the vehicle 30, an area will be provided where the vehicle 30 will be automatically directed. A signal will then be sent to a monitoring station requesting assistance.

Once off the guideway, the control arms will automatically retract into the sides of the vehicle 30, wherein the operator will be able to operate the vehicle as a typical personal vehicle, or the vehicle could be automatically piloted without deviating from the scope of the invention.

The invention claimed is:

1. A transportation system incorporating vehicular retention comprising:
  a guideway including a roadway surface with vertical sidewalls located at both terminal edges of the roadway surface, the sidewalls extending upward, perpendicular to the roadway surface and including top panels positioned perpendicular to the sidewall and extending inwards from a top edge of the sidewalls and over the roadway surface, therein creating control slots on each side of the roadway surface if viewed from end on, and,
  a vehicle including extendable control arms hingedly connected to a lower portion of both sides of the vehicle, the control arms being capable of extending and retracting from the vehicle along a horizontal plane generally parallel to the roadway surface and wherein terminal ends of the control arms, when extended, are positioned within the control slots in the sidewalls,
  the control arms being capable of retracting into the vehicle when traveling on existing roads under operator or automatic control.

2. The transportation system of claim 1 including electrical transmission elements located at the terminal ends of the control arms, the electrical transmission elements capable of interacting with corresponding electrical transmission elements located on an inside surface of the sidewalls or top panels.

3. The transportation system of claim 2 wherein end portions located at the terminal ends of the control arms are movable from a position parallel and inline with top surfaces of the control arms to a position generally perpendicular to the top surfaces of the control arms.

4. The transportation system of claim 1 wherein return flanges are included at an inside terminal edge of the top panels, positioned perpendicular to the top panels and extending downward toward the roadway surface.

5. The transportation system of claim 1 wherein the vehicle includes adjustable aerodynamic fairings to compress air under the vehicle as it travels thereby providing a degree of lift to the vehicle.

6. A transportation system incorporating vehicular retention comprising:
  a guideway including a roadway surface with a vertical sidewall located at a terminal edge of the roadway surface, the sidewall extending upward, perpendicular to the roadway surface and including a top panel positioned perpendicular to the sidewall and extending inwards from a top edge of the sidewall over the roadway surface and including a return flange at an inside terminal edge of the top panel, positioned perpendicular to the top panel and extending downward toward the roadway surface, therein creating a control slot on a side of the roadway surface if viewed from end on,
  and,
  a vehicle including an extendable control arm hingedly connected to a lower portion of the vehicle, the control arm being capable of extending and retracting from the vehicle along a horizontal plane generally parallel to the roadway surface and wherein a terminal end of the control arm, when extended, is positioned within the control slot in the sidewall,
  the control arm being capable of retracting into the vehicle when traveling on existing roads under operator or automatic control.

* * * * *